United States Patent [19]

Nishimiya et al.

[11] Patent Number: 4,541,201
[45] Date of Patent: Sep. 17, 1985

[54] SEALING STRUCTURE FOR AN AUTOMOTIVE VEHICLE WITH A SLIDING DOOR

[75] Inventors: Ryuji Nishimiya, Hiratsuka; Yoshimasa Tuchiya, Ebina; Takayo Chikaraishi, Kawasaki, all of Japan

[73] Assignees: Nissan Motor Company, Limited, Yokohama; Nissan Shatai Company, Limited, Hiratsuka, both of Japan

[21] Appl. No.: 525,501

[22] Filed: Aug. 22, 1983

[30] Foreign Application Priority Data

Aug. 23, 1982 [JP] Japan ............... 57-145850

[51] Int. Cl.⁴ ........................... E05D 15/10
[52] U.S. Cl. ..................... 49/221; 49/484; 49/485
[58] Field of Search ............... 49/213–216, 49/218, 221, 223, 225, 485, 484

[56] References Cited

U.S. PATENT DOCUMENTS

| 2,312,812 | 3/1943 | Geyer | 49/484 X |
| 2,992,851 | 7/1961 | Barenyi | 49/223 |
| 3,728,819 | 4/1973 | Goldbach et al. | 49/216 |

FOREIGN PATENT DOCUMENTS

| 1218104 | 12/1959 | France | 49/213 |
| 953029 | 3/1964 | United Kingdom | |

*Primary Examiner*—Kenneth Downey
*Attorney, Agent, or Firm*—Schwartz, Jeffery, Schwaab, Mack, Blumenthal & Evans

[57] ABSTRACT

A sealing structure for an automotive sliding door comprising a lower seal attached to the lower edge of the sliding door. The lower seal is adapted to contact a lower vertical edge portion of a lower guide rail upon which the sliding door is slidably suspended to establish a water-tight seal between the guide rail and the lower edge of the sliding door. The guide rail is mounted on a lower side frame of the automotive vehicle, and a weatherstrip is also installed on the vehicle body lower side frame. The weatherstrip is adapted to contact the inner surface of the sliding door to establish another water-tight seal. In this way a double seal is obtained around the lower edge of the sliding door, and the lower guide rail is satisfactorily isolated from leaking moisture.

8 Claims, 4 Drawing Figures

SEALING STRUCTURE FOR AN AUTOMOTIVE VEHICLE WITH A SLIDING DOOR

BACKGROUND OF THE INVENTION

The present invention relates generally to a sealing structure for an automotive vehicle which has a sliding door. More specifically, the invention relates to a sealing structure around a lower guide rail upon which the sliding door is slidably suspended.

In general, a vehicle sliding door is mounted by means of guide rails on the side portion of vehicle body for opening and closing a door opening. The guide rails are formed along the upper end and lower edges of the door opening. A water-tight seal is required around the guide rail to prevent leakage of rain water and so forth into the vehicle body.

SUMMARY OF THE INVENTION

Accordingly, it is an object of the present invention to provide a sealing structure for an automotive vehicle which is positioned outside of a guide rail so that it can prevent rain water and so forth from leaking into or around the guide rail.

Another object of the present invention is to provide a lower seal for an automotive sliding door construction which includes a lower guide rail rigidly mounted to the outer periphery of a vehicle side sill.

These and other objects of the invention are achieved by providing a sealing structure for an automotive vehicle comprising a guide rail extending along a lower edge of a door opening in the vehicle, a sliding door having a configuration conforming to the configuration of at least part of the door opening, a slider mounted on said door adjacent the bottom thereof and slidably engaging said guide rail, whereby said guide rails sliding movement of said door into and out of the door opening, and a resilient sealing member along the lower edge of said door, said sealing member contacting a lower portion of the guide rail to establish a fluid-tight seal between the door and the guide rail when the door is slid into the door opening.

According to the present invention, the sealing structure includes a lower seal member attached to the lower edge portion of the sliding door and extending therealong. The lower seal member is adapted to resiliently contact the lower outer vertical section of the guide rail mounted on the outer periphery of a side sill to establish a fluid-tight seal therebetween.

By providing the lower seal of the sliding door outside of the guide rail, leakage of rain water, dust and so forth into or around the guide rail can be prevented. Further, the foregoing lower seal may co-operate with a weatherstrip installed along the side sill to constitute a double seal for isolating the vehicle compartment from the exterior to prevent leakage of rain water, dust and so forth into the vehicle.

BRIEF DESCRIPTION OF THE DRAWINGS

The present invention will be described in more detail with reference to the accompanying drawings of a preferred embodiment of the invention, which, however, should not be taken to limit the invention to the specifically illustrated embodiment but are for illustration and explanation only.

In the drawings.

DESCRIPTION OF THE PREFERRED EMBODIMENT

Figure 1:
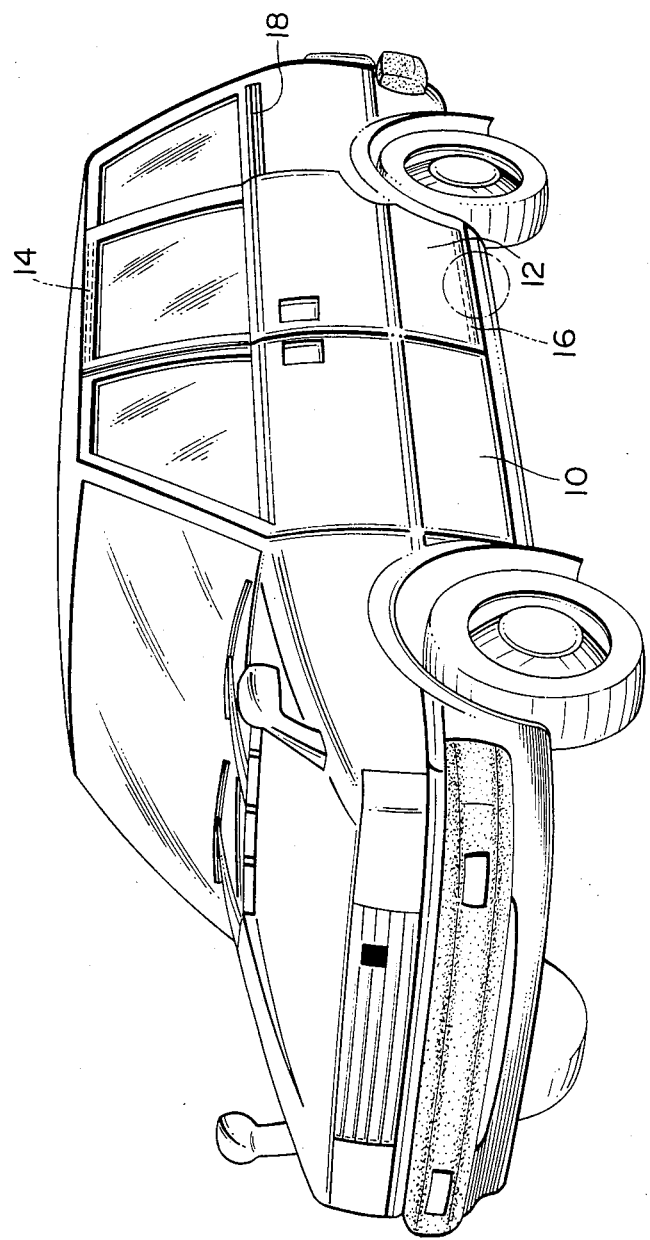
FIG. 1 is a perspective illustration of a vehicle having a rear sliding door to which a preferred sealing structure according to the present invention is applied.
Figure 2:
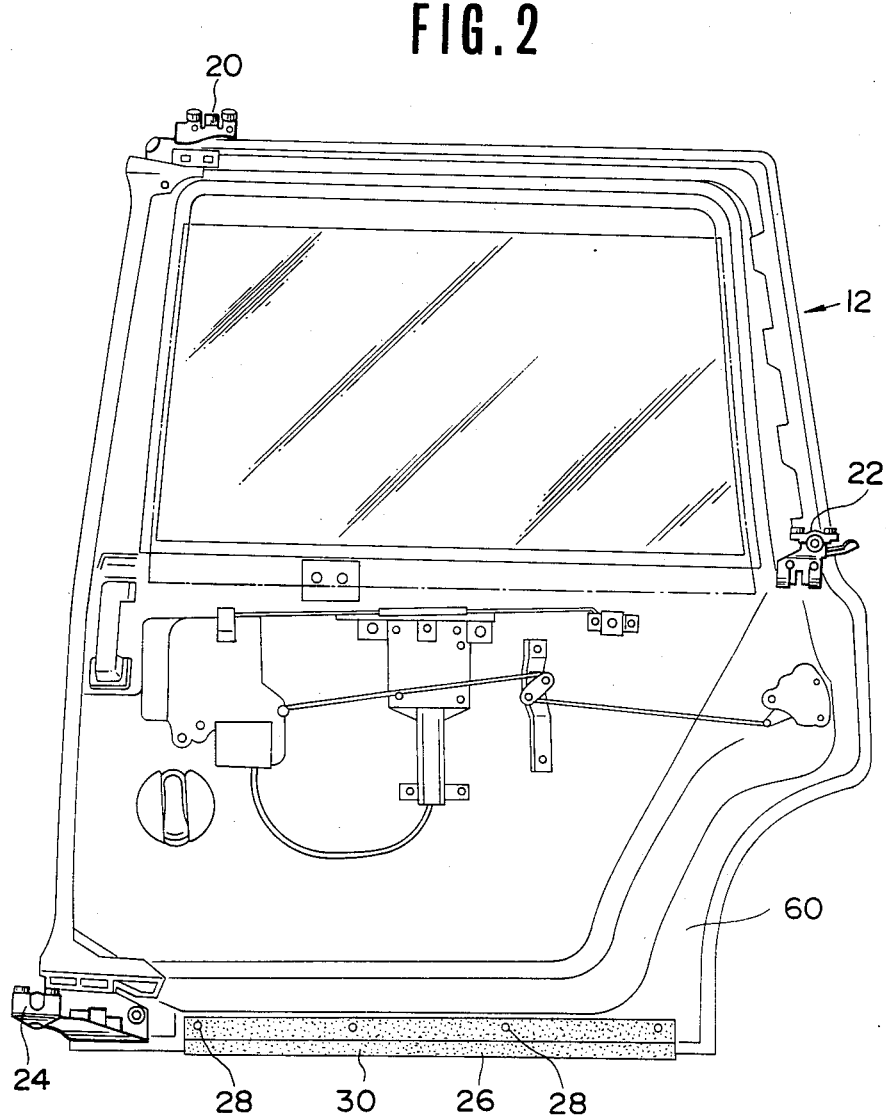
FIG. 2 is a rear elevation of the sliding door with a lower seal member of the preferred embodiment.

Referring now to the drawings, particularly to FIG. 1, a vehicle is illustrated having a front swing door 10 and a rear sliding door 12. The sliding door 12 slidably suspended on the vehicle body by means of an upper guide rail 14, a lower guide rail 16 and a waist guide rail 18. Upper, waist, and lower slider assemblies 20, 22 and 24 are mounted on the sliding door 12, as shown in FIG. 2. The upper, waist and lower slider assemblies 20, 22 and 24 respectively, slidably engage corresponding upper, waist and lower guide rails 14, 18 and 16 for sliding movement of the sliding door therealonginto and out of the door opening of the vehicle.

Figure 3:
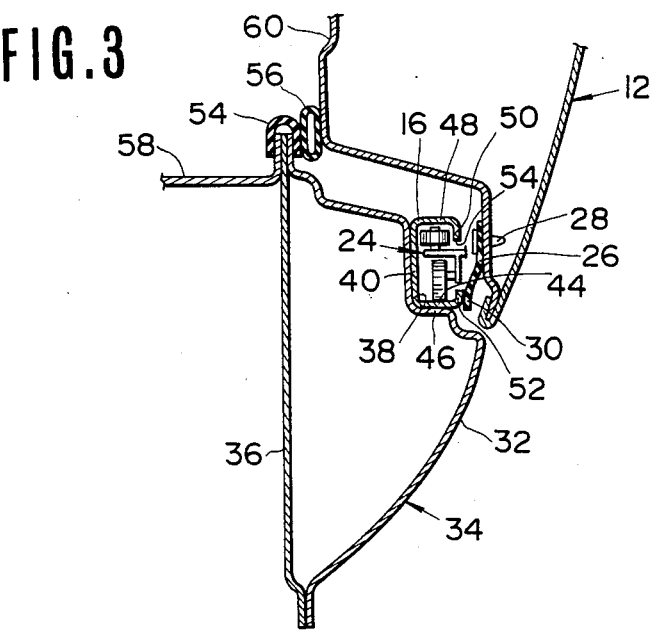
FIG. 3 is a cross-section of the portion encircled in FIG. 1.

As shown in FIGS. 2 and 3, a lower seal member 26 is attached to the lower edge of sliding door 12 by means of a plurality of fastener screws 29. The lower seal member 26 comprises a strip of elastomeric material and has a resilient, inwardly projecting lip portion 30.

Lower guide rail 16 is rigidly secured onto a side sill outer member 32 which forms with a side sill inner member 36, a side sill 34 of generally box-shaped cross-section. The side sill outer member 32 has a stepped guide rail recess 38 in which the lower guide rail 16 is mounted. The lower guide rail 16 is of essentially C-shaped channel cross section to receive the lower slider assembly 26. The lower guide rail 16 thus includes a vertical section 40 fitted to the vertical portion 42 of the guide rail rest 38, and lower horizontal section 44 extending from the vertical section 40 and fitted to horizontal section 46 of the guide rail rest 38. An upper horizontal section 48 also extends from the vertical section 40 in substantially parallel relationship with the lower horizontal section 44. Outer ends of the horizontal sections 44 and 48 are bent to form vertical sections 52 and 50. The edges of the vertical sections 52 and 50 are spaced apart from each other to leave a longitudinally extending opening 54 through which the lower slider assembly 24 is received.

The lip portion 30 of the lower seal member 26 is adapted to contact the vertical section 52 of the lower guide rail 16 when door 12 is slid into the closed position so as to establish water-tight seal between the door and the guide rail.

A weatherstrip 54 with a cross-sectionally hollow cylindrical extension 56 is also installed on the top of the side sill 34, where a vehicle floor panel 58 is rigidly secured. Extension 56 protrudes outwardly to contact a door inner panel 60 of the sliding door 12 to establish a water-tight seal between the side sill 34 and the door 12.

In the foregoing construction, the seal structure according to the present invention can satisfactorily and successfully prevent rain water, dust and so forth from leaking into the inside of the vehicle compartment. The double seal established by the lower seal member and by the weatherstrip further protects against leakage. Further, moisture is prevented from leaking into or around the lower guide rail itself by the seal established by the lower seal member in contact with the lower outer portion of the lower guide rail.

Figure 4:
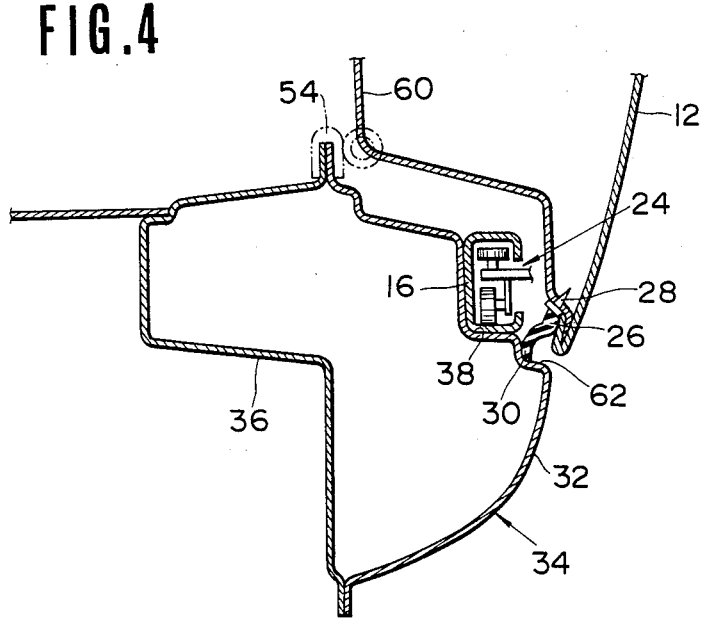
FIG. 4 is a cross-section similar to FIG. 3 but showing a modification of the arrangement of FIGS. 1–3.

FIG. 4 shows a modification of the sealing structure of FIGS. 1-3. In this modification, the side sill outer member 32 is formed with another step portion 62 below the guide rail rest 38. The lower seal member 26 is disposed opposite the step 62 to abut the lip portion 30 to establish a water-tight seal therebetween in order to provide a similar sealing effect.

What is claimed is:

1. A sealing structure for an automotive vehicle comprising:
    a door opening having a lower edge;
    a guide rail extending along the lower edge of the door opening in said vehicle;
    a sliding door having a configuration conforming to the configuration of at least part of said door opening, said sliding door including an outer door member and an inner door member having a lower edge surface opposing the lower edge of said door opening;
    a slider mounted on said door adjacent the bottom thereof and slidably engaging said guide rail, whereby said guide rail guides sliding movement of said door into and out of said door opening; and
    a resilient sealing member along said lower edge surface of said inner door member, said sealing member contacting said lower edge of said door opening in sliding fashion to establish a fluid-tight seal between said door and said lower edge of said door opening when said door is slid into said door opening, said resilient sealing member being mounted in a position so that it is concealed when the door is in an open position and also in a closed position.

2. A sealing structure as set forth in claim 1, wherein said guide rail is rigidly secured to the outer periphery of a side sill of said vehicle.

3. A sealing structure as set forth in claim 2, further comprising a weatherstrip attached to said side sill interiorly of said sealing member for establishing a water-tight seal between the side sill and the sliding door.

4. A sealing structure as set forth in claim 3, wherein said sealing member is releasably secured to the lower edge portion of said sliding door with a fastener.

5. A sealing structure for an automotive vehicle according to claim 1 wherein said guide rail has an essentially C-shaped channel cross section comprising an inner vertical section, a lower horizontal section extending from the bottom of said inner vertical section, an upper horizontal section extending from the top of said inner vertical section, a lower outer vertical section extending from the outer end of said lower horizontal section and an upper outer vertical section extending from the outer end of said upper horizontal section, and said sealing member sealingly contacts said lower outer vertical section of said guide rail when the door is slid into said door opening.

6. A sealing structure for an automotive vehicle according to claim 1 wherein said sealing member comprises a strip of elastomeric material.

7. A sealing structure for an automotive vehicle according to claim 6 wherein said elastomeric strip has an inwardly projecting lip portion.

8. A sealing structure for an automotive vehicle, comprising:
    a guide rail extending along a lower edge of a door opening in said vehicle, having an essentially C-shaped channel cross section including an inner vertical section, a lower horizontal section extending from the bottom of said inner vertical section, an upper horizontall section extending from the top of said inner vertical section, a lower outer vertical section extending from the outer end of said lower horizontal section and an upper outer vertical section extending from the outer end of said upper horizontal section;
    a sliding door having a configuration conforming to the configuration of at least part of said door opening;
    a slider mounted on said door adjacent the bottom thereof and slidably engaging said guide rail, whereby said guide rail slidingly guides said door into and out of said door opening;
    a side sill on the vehicle having an outer periphery, wherein said guide rail is rigidly secured to said outer periphery of said sill;
    a resilient sealing member along the lower edge of said door, said sealing member contacting a lower portion of said guide rail to establish a fluid-tight seal between said door and said lower outer vertical section of said guide rail when said door is slid into said door opening; and
    a weatherstrip attached to said side sill interiorly or said sealing member for establishing a water-tight seal between the side sill and the sliding door.

* * * * *